(12) United States Patent
Forster et al.

(10) Patent No.: US 7,891,112 B2
(45) Date of Patent: Feb. 22, 2011

(54) GUIDING DEVICE WITH MEASURING SCALE FOR GUIDING A MOVEABLE MACHINE ELEMENT OF A MACHINE

(75) Inventors: Gerhard Forster, Schwarzenbruck (DE); Jens Hamann, Fürth (DE); Dietmar Stoiber, Fürth (DE)

(73) Assignee: Siemens Aktiengesellschaft, München (DE)

( * ) Notice: Subject to any disclaimer, the term of this patent is extended or adjusted under 35 U.S.C. 154(b) by 414 days.

(21) Appl. No.: 11/574,788

(22) PCT Filed: Aug. 26, 2005

(86) PCT No.: PCT/EP2005/054213

§ 371 (c)(1),
(2), (4) Date: Nov. 4, 2008

(87) PCT Pub. No.: WO2006/027317

PCT Pub. Date: Mar. 16, 2006

(65) Prior Publication Data

US 2009/0050782 A1    Feb. 26, 2009

(30) Foreign Application Priority Data

Sep. 6, 2004    (DE) ................... 10 2004 043 055

(51) Int. Cl.
*G01D 5/347* (2006.01)
*G01D 5/00* (2006.01)
(52) U.S. Cl. .......................... 33/706; 33/702
(58) Field of Classification Search ........... 33/702–704, 33/706–708, 503, 558, 1 M, 705
See application file for complete search history.

(56) References Cited

U.S. PATENT DOCUMENTS 4,037,325 A * 7/1977 Weber et al. ................ 33/707

(Continued)

FOREIGN PATENT DOCUMENTS

DE    27 12 421 C2    9/1978

(Continued)

OTHER PUBLICATIONS

Dietmar Stoiber. Markus Knorr: Ruckfrei dank der Impulsentkopplung 1μm bei 30 g Beschleunigung: Werkstatt und Betrieb, Jahrgang 133 (2000), Heft 6, Selten 160-164, Carl Hanser Verlag, München.

*Primary Examiner*—Yaritza Guadalupe-McCall
(74) *Attorney, Agent, or Firm*—Henry M. Feiereisen; Ursula B. Day

(57) ABSTRACT

The invention relates to a guiding device (3) for guiding a displaceable machine element (1) of a machine. Said guiding device (3) in connected in a mechanically fixed manner to a machine bed (4). A material measure (6) is arranged along at least one part of the guiding device (3) in order to determine a position of the machine element (1). The guiding device (3) and the material measure (6) can be displaced in relation to each other and at least one part of the material measure (6) is in contact with the guiding device (3) either directly or via a bearing (9). The inventive guiding device (3) enables the displaceable machine elements to be positioned in a precise manner even when the machine bed (4) is vibrated. The invention also relates to a machine comprising said type of guiding device (3).

15 Claims, 3 Drawing Sheets

U.S. PATENT DOCUMENTS

| | | | |
|---|---|---|---|
| 4,570,346 A * | 2/1986 | Burkhardt | 33/706 |
| 4,584,773 A | 4/1986 | Rieder et al. | |
| 4,776,098 A * | 10/1988 | Nelle | 33/702 |
| 4,777,728 A * | 10/1988 | Ludicke | 33/702 |
| 5,711,084 A * | 1/1998 | Spanner et al. | 33/706 |
| 6,433,875 B1 * | 8/2002 | Kovac | 356/498 |
| 6,578,283 B2 * | 6/2003 | Nishi | 33/706 |
| 6,668,467 B2 * | 12/2003 | Shimomura et al. | 33/542 |
| 7,121,015 B2 * | 10/2006 | Boge | 33/707 |
| 7,207,121 B2 * | 4/2007 | Wixey | 33/613 |
| 7,580,804 B2 * | 8/2009 | Wixey | 702/85 |
| 2002/0066201 A1 | 6/2002 | Boge et al. | |
| 2003/0159305 A1 * | 8/2003 | Wahl et al. | 33/707 |
| 2003/0182816 A1 * | 10/2003 | Huber et al. | 33/707 |
| 2005/0005468 A1 * | 1/2005 | Wixey | 33/613 |
| 2006/0107545 A1 * | 5/2006 | Boge | 33/707 |
| 2009/0278019 A1 * | 11/2009 | Hamann et al. | 248/542 |

FOREIGN PATENT DOCUMENTS

| | | |
|---|---|---|
| DE | 42 41 111 A1 | 6/1994 |
| DE | 198 10 996 A1 | 9/1999 |
| DE | 295 22 402 U1 | 1/2003 |
| DE | 102 14 426 A1 | 10/2003 |
| DE | 102 43 021 A1 | 3/2004 |
| EP | 0 264 801 A1 | 4/1986 |
| EP | 0 905 486 A | 3/1999 |
| EP | 1 111 346 A | 6/2001 |
| WO | WO 91/18594 | 10/1991 |

* cited by examiner

GUIDING DEVICE WITH MEASURING SCALE FOR GUIDING A MOVEABLE MACHINE ELEMENT OF A MACHINE

BACKGROUND OF THE INVENTION

The invention relates to a guiding device for guiding a moveable machine element of a machine and also to a machine having such a guiding device.

In machines such as machine tools, production machines and/or robots, a moveable machine element such as a guiding carriage frequently has to be displaced in a position-regulated manner along a guiding device which may be in the form of a guiding track, for example. FIG. 1 schematically shows a commercial machine tool, where, for reasons of clarity, only those elements which are necessary to understand the invention are shown. A moveable machine element 1, which is designed in the exemplary embodiment in the commercial machine in the form of a guiding carriage, is guided by a guiding device 3, which is provided in the exemplary embodiment in the form of a guiding track. The machine element 1 is equipped with a drive, for example a linear drive, which is not shown for reasons of clarity and is used by an open-loop and/or closed-loop control system to displace the machine element 1 in a position-regulated manner along the guiding device 3. The guiding device 3 is connected in a mechanically fixed manner to a machine bed 4 which stands on a floor 5.

A measuring scale 6, which may be, for example, in the form of a strip having a regular graduation, is connected in a mechanically fixed manner to and along the guiding device 3 in order to determine the position of the machine element 1. The measuring scale 6 has, for example, a "graduation" in the form of lines, which graduation can be read by a reading head 2 connected to the machine element 1. The measuring scale 6, in conjunction with the reading head 2, therefore permits an exact determination of the position of the machine element 1.

In a commercial machine, further fixtures, for example in the form of a spindle with tools, which can be displaced along the guiding device 3 using the machine element 1, are provided on the latter, which is in the form of a "guiding carriage" in the exemplary embodiment. In a machine of this type, the workpiece to be machined is often anchored directly to the floor. The machine element 1 and the fixtures attached thereto form a "tool carriage". If desired, a tool carriage can have multiple guiding carriages rather than just one guiding carriage. In machines such as machine tools, production machines and/or robots, the machine carriages must be positioned with a high degree of precision and at high speed, while maintaining prescribed displacement profiles. The prescribed displacement profiles include speed changes which necessitate high acceleration forces. The quick change in the acceleration forces causes the mechanical system of the machine, in particular the machine bed 4, to oscillate. The machine bed 4 is often stressed very strongly by the reaction forces of the movement guidance. The influence of the acceleration forces of the tool carriage causes the machine bed to give way in the opposite direction. In the process, it is frequently deformed and/or begins to oscillate. Even if the machine element 1 can be positioned exactly in relation to the machine bed 4, the machine bed 4 itself still oscillates with respect to the floor 5. If the machine is a portal milling machine, for example, in which the workpiece to be machined is fixedly anchored on the floor, the oscillations of the machine bed 4 can be seen from the workpiece, even if the machine element 1 maintains exactly the prescribed position in relation to the machine bed 4.

The oscillations of the machine bed 4 frequently have such an unfavorable effect that the closed-loop control characteristics of the movement guidance of the machine element 1 are strongly compromised and not even a movement guidance of the machine element 1 in relation to the machine bed 4 that is sufficiently precise can be achieved. In that case the oscillations of the machine bed 4 occurring during the movement guidance have a doubly disadvantageous effect.

The prior art strives to suppress undesired oscillations of the machine bed by means of a correspondingly rigid and heavy design of the machine bed. The machine bed, however, becomes heavy, complex and expensive on account of this.

If a direct linear drive is used as the driving system for the machine element, it is possible to separate the reaction surface of the motor from the machine bed. This fact is disclosed by the laid-open specification DE 198 10 996 A1. The document proposes decoupling of the motor reaction surface from the machine bed, with the reference point of the axis control remaining on the machine bed. The document proposes to anchor the motor reaction surface with respect to the machine bed such that it can move. This causes the reaction force which arises as a direct consequence of the acceleration operations to be absorbed in the motor reaction surface of moveable design and in this manner to be kept away from the machine bed. The machine bed therefore remains at rest even given severe changes in speed of the tool carriage, which significantly improves the accuracy of the movement guidance of the tool carriage. The reference point for the determination of position remains here unchanged on the machine bed for the closed-loop control, for example. Feed drives designed according to this technical teaching are used in machine tools for example in which the tool carriage is subjected to high accelerations. It has been shown, however, that the necessary moveable anchoring of the motor reaction surface of the linear direct drive results in significant costs and complexity. They are therefore not used especially as a device for avoiding oscillations in machine beds of cost-effective and light-weight construction.

The laid-open specification DE 198 10 996 A1 proposes to decouple the motor reaction surface from the machine bed in order to improve the movement guidance in a machine having a machine bed which is able to oscillate.

It is known from the laid-open specification WO 91/16594 to integrate a position measurement system into a rolling element guiding means. The measuring scale of the position measurement system is here fixedly anchored to the guide track of the rolling element guiding means.

The journal "Werkstatt und Betrieb" [Workshop and Operations], page 160 to 164, year 133 (2000)6, Carl Hansa Verlag, Munich, discloses a guiding device located on a first portal for guiding a moveable machine element, wherein a measuring scale is attached to a second portal which is physically separate from the first portal. The measuring scale and the guiding device are physically separate from one another on account of the spacing between the two portals. The physically wide and relatively irregular spacing between the two portals entails that the spacing between measuring scale and the reading head of the machine element is subject to fluctuations. The measurement system, however, reacts with great sensitivity to change in the spacing between measuring scale and guiding device because, for example, the graduation marked on the measuring scale (a graduation may be provided for example in the form of lines marked on the measuring scale) can no longer be read off exactly by the reading head. This has a very strongly negative effect on the positioning accuracy of the machine element.

SUMMARY OF THE INVENTION

The invention is based on the object of providing a guiding device for guiding a moveable machine element of a machine, which enables exact positioning of the moveable machine element even if the machine bed oscillates.

This object is achieved by virtue of a guiding device for guiding a moveable machine element of a machine, wherein the guiding device is connected in a mechanically fixed manner to a machine bed, and wherein a measuring scale for determining a position of the machine element is arranged along at least part of the guiding device, wherein the guiding device and the measuring scale can move in relation to one another, and with at least part of the measuring scale is in contact with the guiding device directly or via a bearing.

A first advantageous refinement of the invention is characterized in that the bearing is in the form of a sliding contact bearing. Sliding contact bearings can be provided especially cost-effectively as compared to other types of bearing.

It also proves advantageous if the bearing is in the form of a rolling element bearing, since this ensures a particularly exact guidance of the measuring scale along the guiding device.

It furthermore proves advantageous if the measuring scale is connected to an anchor arranged outside the machine bed. This ensures that the measuring scale is anchored with respect to the oscillating machine bed such that it is at rest.

It furthermore proves advantageous if the anchor is a workpiece to be machined, since in that case the position of the machine element with respect to the workpiece is measured directly.

It furthermore proves advantageous if a hold-down exerts pressure on the measuring scale in the direction of the guiding device, since in that case the measuring scale is continuously in uniform contact with the bearing.

It proves advantageous in this context to equip a machine with the guiding device according to the invention.

Use of the guiding device according to the invention is especially advantageous in machine tools, production machines and/or robots, since in these technical fields high positioning accuracy of the machine element is often necessary. However, the guiding device according to the invention can of course also be used in machines in other technical fields.

BRIEF DESCRIPTION OF THE DRAWING

An exemplary embodiment of the invention is shown in the drawing and is explained in more detail below. In the figures.

DETAILED DESCRIPTION OF PREFERRED EMBODIMENTS

Figure 1:
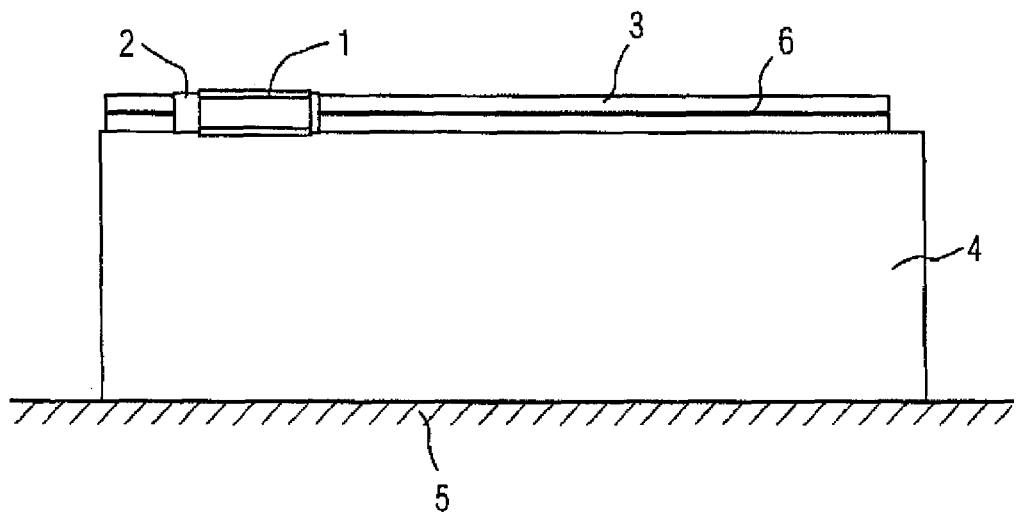
FIG. 1 shows a schematically illustrated machine according to the prior art.
Figure 2:
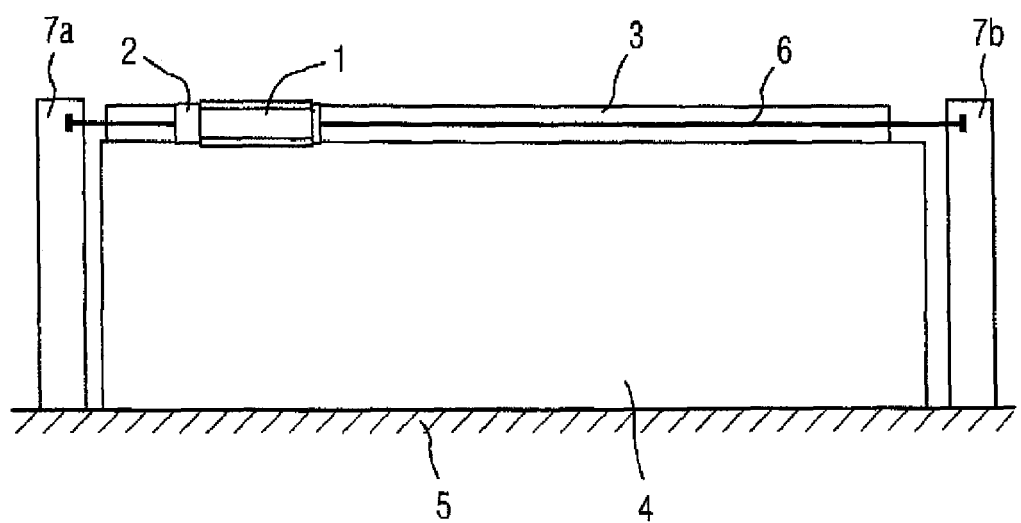
FIG. 2 shows a schematically illustrated machine with the guiding device according to the invention.

FIG. 2 shows a schematic illustration of a machine with the guiding device according to the invention. With respect to the basic design, the embodiment illustrated in FIG. 2 corresponds substantially to the embodiment described previously in FIG. 1. Identical elements are therefore provided with the same reference symbols in FIG. 2 as in FIG. 1. The essential difference with respect to the embodiment according to FIG. 1 involves the measuring scale 6 not being connected in a mechanically fixed manner to the guiding device 3, but the guiding device 3 and the measuring scale 6 being able to move in relation to one another, with at least part of the measuring scale 6 being in contact with the guiding device 3 directly or via a bearing. The bearing can be used firstly to move the guiding device 3 and the measuring scale 6 in relation to one another and, secondly, it is used to determine the spacing between reading head 2 and the measuring scale 6 exactly along the entire measuring scale 3, and the spacing is not subject to any fluctuations. Furthermore, in the embodiment according to FIG. 2 as compared to the embodiment according to FIG. 1, the measuring scale 6 is connected to an anchor which is arranged outside the machine bed 4 and, in the exemplary embodiment, is in the form of the two supports 7a and 7b. Since the anchor is physically separate from the machine bed 4, said anchor does not oscillate with the machine bed and thus ensures that the measuring scale 6 is anchored at rest. The measuring scale 6 does not always have to be arranged along the entire guiding device 3 as in the exemplary embodiment, however, but can also be arranged along only part of the guiding device 3. The guiding device 3 is connected in a mechanically fixed manner to the machine bed 4.

Figure 3:
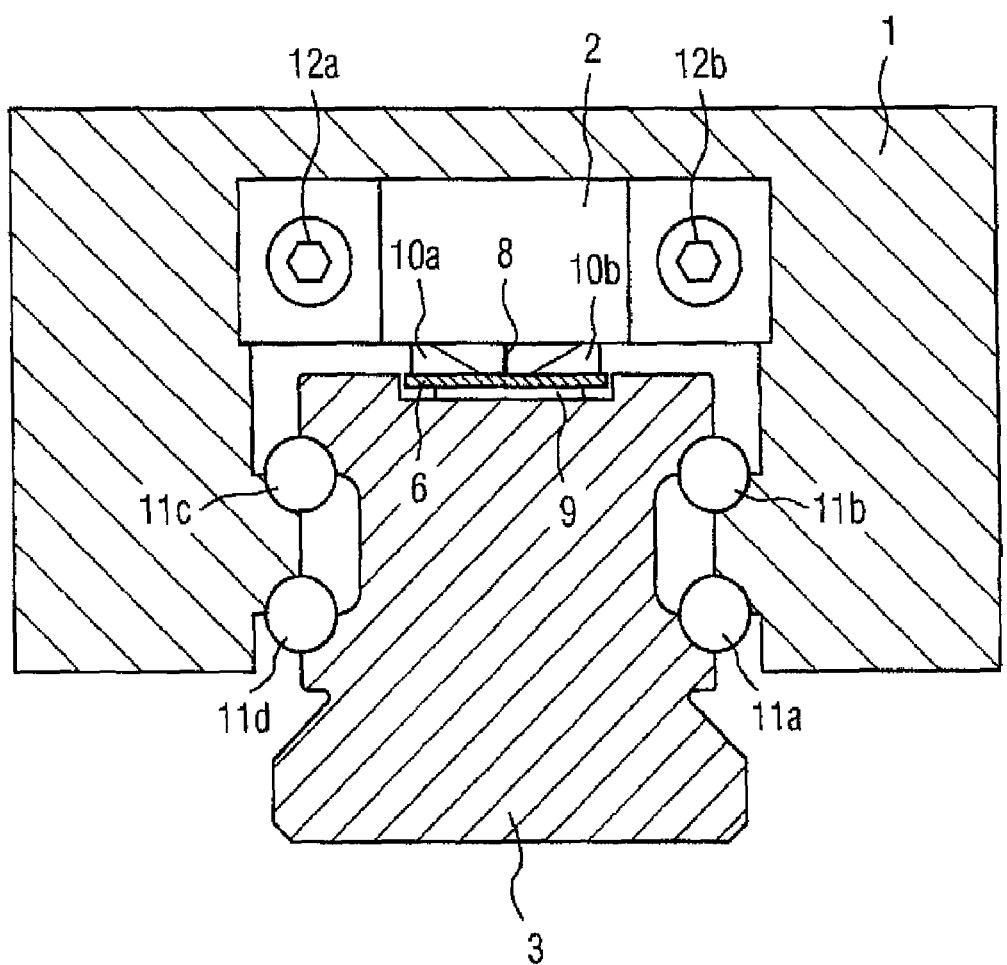
FIG. 3 shows a cross-sectional drawing of the guiding device according to the invention.

FIG. 3 illustrates the guiding device 3 according to the invention in the form of a cross-sectional drawing. The guiding device 3 is, in the exemplary embodiment according to FIG. 3, in the form of a guiding track. The moveable machine element 1, in the exemplary embodiment in the form of a guiding carriage, is moveably connected to the guiding device 3 via four rows of balls 11a, 11b, 11c and 11d. The movement of the machine element 1 along the guiding device 3 is guided by these. The drive system of the machine element 1 for displacing the machine element 1 along the guiding device 3 is not shown for reasons of clarity, since it is not essential for understanding the invention. The fixtures which are usually present on the machine element 1, such as a spindle and/or tools, are not illustrated for reasons of clarity and because they are not necessary for understanding the present invention. The reading head 2 is screwed onto the machine element 1 by means of two screws 12a and 12b. The reading head 2 scans the measuring scale 6, which, in the exemplary embodiment, is in the form of a strip, with the aid of a light beam 8. The measuring scale 6 is supported on the guiding device 3 via a bearing 9 and moveably connected to the guiding track 3 in this manner.

In the exemplary embodiment according to FIG. 3, the bearing 9 is in the form of a rolling element bearing. Thus, a multiplicity of rolling bodies are provided via which the measuring scale 6 is in contact with the guiding device 3. The spacing between reading head 2 and measuring scale 6 is identical along the entire measuring scale 6 and is not subject to any fluctuations on account of the fact that the measuring scale 6 is supported against the guiding device 3 by means of the bearing 9. The measuring scale 6 can thus be read off exactly by the reading head 2 at any desired position. Two hold-downs 10a and 10b, which are connected, in the exemplary embodiment, to the reading head 2 and exert slight pressure on the measuring scale 6 in the direction of the guiding device, ensure that the measuring scale 6 continuously maintains uniform contact with the bearing 9. Rather than the two hold-downs 10a and 10b, it is of course also possible for only one hold-down to be provided, or additional hold-downs can be used.

In the embodiment according to FIG. 3, the bearing 9 is in the form of a rolling body bearing, wherein balls or rollers, for example, can be used as rolling elements. As an alternative, however, the bearing 9 can also be in the form of a sliding contact bearing, wherein an oil-containing substance, for example, can be used as lubricant between guiding device 3 and measuring scale 6. As an alternative, the guiding device 3 and/or measuring scale 6 can also be coated with an antifriction coating, such as Teflon, and a sliding contact bearing can be provided even without lubricant in this manner.

As an alternative, for example the measuring scale 6 and/or the guiding device 3 itself may also have a smooth surface even without coating, for example by means of corresponding polishing treatment, so that the necessary sliding characteristics between guiding device 3 and measuring scale 6 are provided even without the use of a bearing. The measuring scale 6 is, in this case, in direct contact with the guiding device 3.

Figure 4:
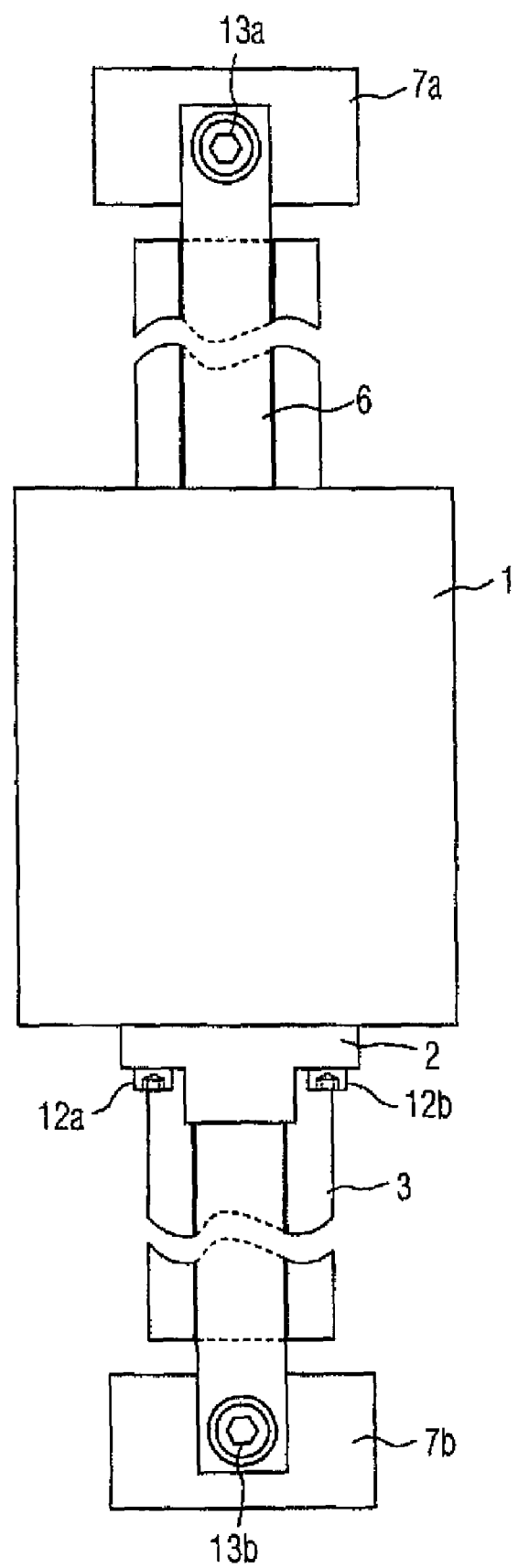
FIG. 4 shows a plan view of the guiding device according to the invention.

FIG. 4 illustrates the guiding device 3 according to the invention in the manner of a plan view. The machine element 1 can be moved along the guiding device 3. The reading head 2 is screwed onto the machine element 1 with the aid of two screws 12a and 12b. The measuring scale 6 is screwed, with the aid of two screws 13a and 13b, onto the respectively associated supports 7a and 7b, which, according to FIG. 2, are located outside the machine bed, so that the measuring scale 6 is anchored to the supports 7a and 7b, which form an anchor, such that it is at rest.

It is of course also conceivable to provide the anchor for the measuring scale in the form of a workpiece to be machined. In that case, the position of the machine element 1 is measured with direct reference to the workpiece.

With the aid of the present invention it is no longer necessary to design the machine bed itself such that it is correspondingly resistant to oscillations in order to ensure exact positioning of the machine element in relation to a reference system at rest. The ability of the machine bed to oscillate can be tolerated to the benefit of a simple and cost-effective design of the machine bed, without the quality of a workpiece to be machined being affected by it. Since, on account of the guiding device according to the invention, the machine bed oscillations no longer have a negative effect on the measurement of the position of the moveable machine element of the machine, it is also possible, for example, for the controller gain of the position controller responsible for the positioning of the machine element to be increased such that a more dynamic movement guidance of the machine element can be achieved, which enables faster processing times.

As an alternative to the described guiding device according to the invention it is also conceivable, in order to achieve the object according to the invention, to use the guiding device according to FIG. 1, in which the measuring scale 6 is connected in a mechanically fixed manner to the guiding device 3. The reading head 2 according to FIG. 1 here produces a first position signal. A measuring transducer is attached to a support arranged outside the machine bed, as is drawn, for example, in FIG. 2, which measuring transducer measures the position between the support at rest and the oscillating machine bed and in this manner produces a second position signal. Furthermore, the two position signals are then added in an electronic circuit and in this manner the position of the machine element with respect to a reference system at rest is determined, which means with respect to the support, in this case. The signal processing time of the electronic circuit should be short so as not to disadvantageously affect the closed-loop control processes connected downstream.

What is claimed is:

1. A guiding device for guiding a moveable machine element of a machine, wherein the guiding device is connected in a mechanically fixed manner to a machine bed, wherein a measuring scale for determining a position of the machine element is arranged along at least part of the guiding device, wherein the guiding device and the measuring scale are moveable in relation to one another, wherein at least part of the measuring scale is in contact with the guiding device, and wherein the measuring scale has opposite ends, each end being connected to an anchor arranged at a distance to the machine bed.

2. The guiding device of claim 1, wherein the part of the measuring scale is in direct contact with the guiding device.

3. The guiding device of claim 1, further comprising a bearing, wherein the part of the measuring scale is in contact with the guiding device via the bearing.

4. The guiding device of claim 3, wherein the bearing is configured in the form of a sliding contact bearing.

5. The guiding device of claim 3, wherein the bearing is configured in the form of a rolling element bearing.

6. The guiding device of claim 5, further comprising a hold-down for exerting pressure on the measuring scale in the direction of the guiding device.

7. The guiding device of claim 1, wherein the anchor is a workpiece to be machined.

8. A machine, comprising:
a moveable machine element;
a machine bed;
a guiding device, connected in a mechanically fixed manner to the machine bed, for guiding the machine element;
a measuring scale, arranged along at least part of the guiding device, for determining a position of the machine element, with the guiding device and the measuring scale moveable in relation to one another and having opposite ends, wherein at least part of the measuring scale is in contact with the guiding device; and
two anchors arranged at a distance to the machine bed for securement of the measuring scale and supporting the ends of the measuring scale, respectively.

9. The machine of claim 8, wherein the part of the measuring scale is in direct contact with the guiding device.

10. The machine of claim 8, further comprising a bearing, wherein the part of the measuring scale is in contact with the guiding device via the bearing.

11. The machine of claim 10, wherein the bearing is configured in the form of a sliding contact bearing.

12. The machine of claim 10, wherein the bearing is configured in the form of a rolling element bearing.

13. The machine of claim 8, wherein the anchor is a workpiece to be machined.

14. The machine of claim 8, further comprising a hold-down for exerting pressure on the measuring scale in the direction of the guiding device.

15. The machine of claim 8, constructed in the form of a machine tool, production machine and/or robot.

* * * * *

UNITED STATES PATENT AND TRADEMARK OFFICE
CERTIFICATE OF CORRECTION

PATENT NO. : 7,891,112 B2  
APPLICATION NO. : 11/574788  
DATED : February 22, 2011  
INVENTOR(S) : Gerhard Forster, Jens Hamann and Dietmar Stoiber Page 1 of 1

It is certified that error appears in the above-identified patent and that said Letters Patent is hereby corrected as shown below:

On the Title Page

Item [56] References Cited, FOREIGN PATENT DOCUMENTS, pg. 2 replace "WO 91/18594" with -- WO 91/16594 --.

Signed and Sealed this
Twenty-sixth Day of April, 2011

David J. Kappos
*Director of the United States Patent and Trademark Office*